United States Patent [19]

Beiser

[11] 4,222,653
[45] Sep. 16, 1980

[54] VISUAL EFFECTS OPTICAL RELAY

[76] Inventor: Leo Beiser, 151-77 28th Ave., Flushing, N.Y. 11354

[21] Appl. No.: 966,054

[22] Filed: Dec. 4, 1978

[51] Int. Cl.$^3$ .................. G03B 9/02; G03B 17/48; G03B 35/00
[52] U.S. Cl. ......................... 354/270; 354/79; 354/112
[58] Field of Search .............. 350/132; 354/79, 112, 354/247, 270, 230, 272, 286; 352/57, 60; 355/67 S

[56] References Cited

U.S. PATENT DOCUMENTS

| | | | |
|---|---|---|---|
| 683,573 | 10/1901 | Pasquarelli | 354/272 X |
| 1,486,231 | 3/1924 | Cox | 354/79 X |
| 1,974,653 | 9/1934 | Herz | 350/132 |
| 3,712,199 | 1/1973 | Songer | 354/112 |
| 3,884,573 | 5/1975 | Franklin | 355/67 S UX |
| 3,967,895 | 7/1976 | Crook | 355/67 S UX |
| 3,968,504 | 7/1976 | Komine | 354/286 X |
| 4,114,171 | 9/1978 | Altman | 354/286 X |
| 4,157,216 | 6/1979 | Plummer | 354/79 X |

*Primary Examiner*—Donald A. Griffin
*Attorney, Agent, or Firm*—Darby & Darby

[57] ABSTRACT

An optical relay is disclosed for use in an imaging system for the purpose of providing special visual effects. In the preferred embodiment, the relay is used to transfer the aperture stop within a camera lens to a location where the light can be modified by appropriate color filtration for anaglyph stereoscopy. For example, the relay may be interposed between the taking lens and body of a camera, and may include a field lens for transferring the aperture stop plane of the taking lens to the central plane of a lens assembly adapted to form an image at an image plane within the camera. The anaglyph color filters and a special iris are positioned near the aperture stop image plane of the lens assembly. The iris is adapted to restrict the light path in essentially only one dimension (vertically) so that, regardless of the amount of light traversing the system, full stereoscopic information is retained.

17 Claims, 8 Drawing Figures

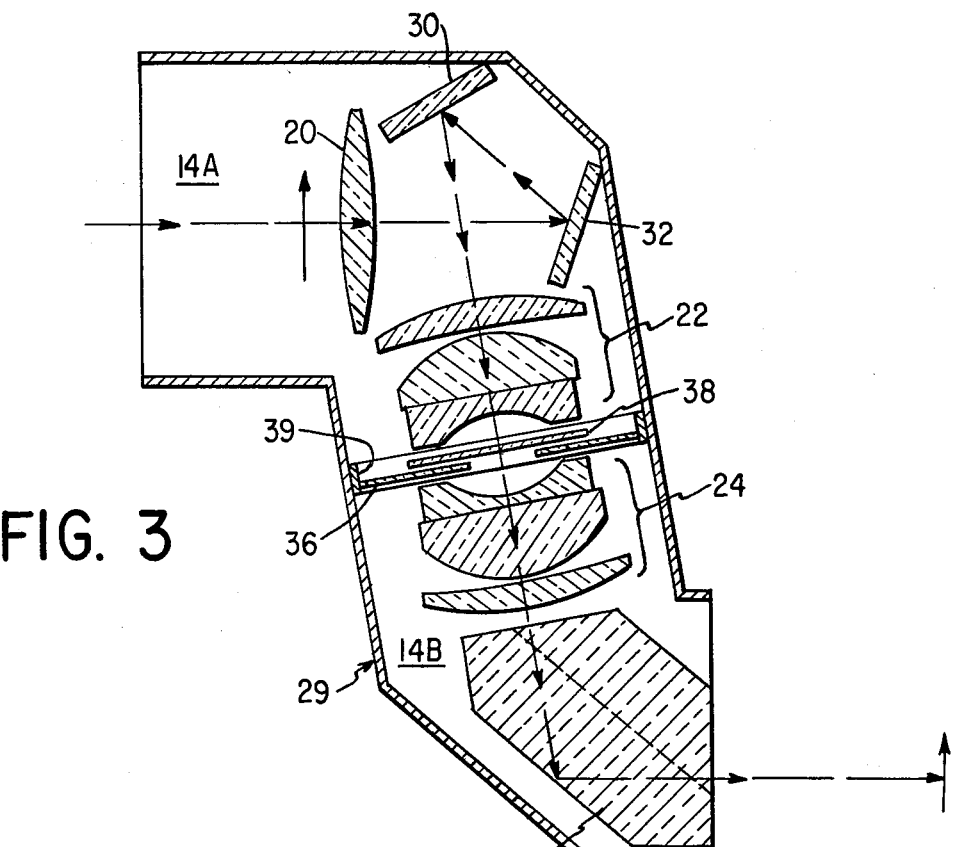
FIG. 3
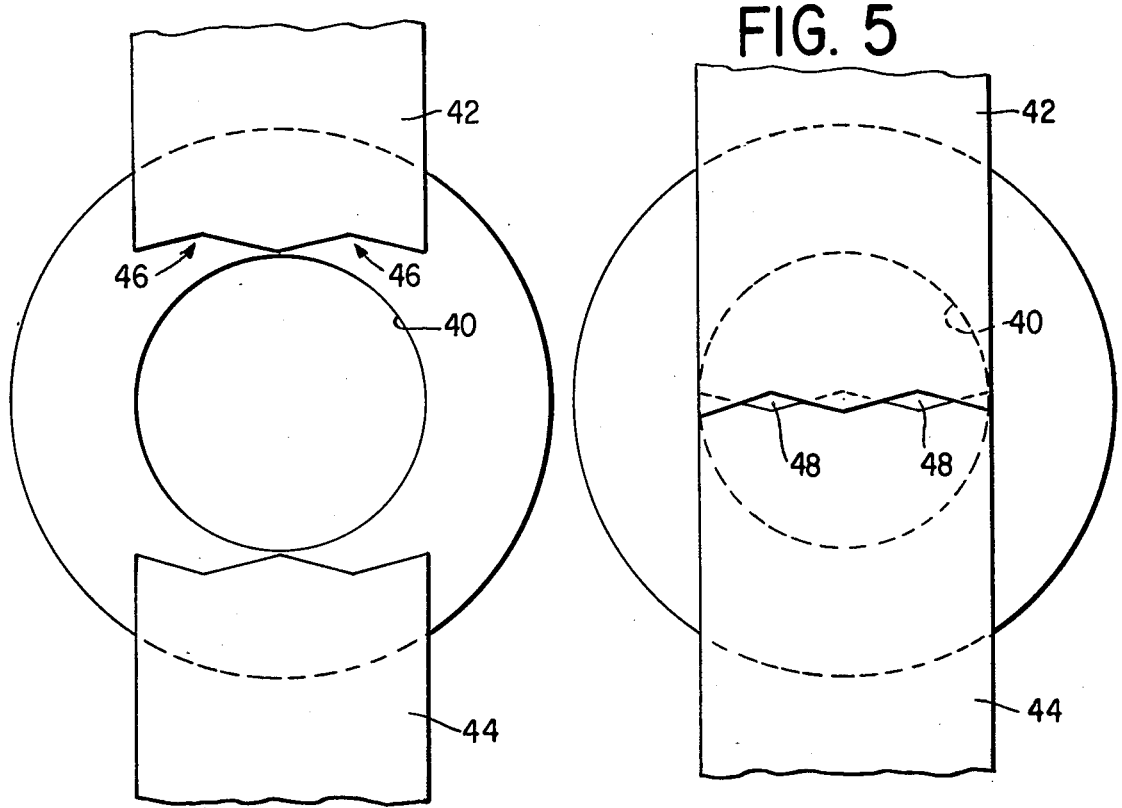
FIG. 4
FIG. 5

VISUAL EFFECTS OPTICAL RELAY

This invention pertains to an optical relay intended to transfer the aperture stop within an existing lens assembly to an accessible location where the light may be conveniently modified or adapted for any of a variety of special purposes.

As its preferred embodiment, the invention is described as an optical relay to be interposed between the taking lens and the body of a photographic camera for use in anaglyph stereoscopy. The invention, however, can be also employed with other types of imaging systems (such as television) and, in its general aspects, is not limited to anaglyph stereoscopy.

BACKGROUND

Anaglyph stereoscopy is a well-known process in which left and right images are color encoded by respective complementary color filters (e.g. cyan and red) for viewing through corresponding glasses to separate the images as required for a three-dimensional effect.

U.S. Pat. No. 3,712,199 of Songer, Jr. discloses an anaglyph stereoscopic imaging system in which a "compatible" two-dimensional picture is taken through a single lens. The photographic print is "compatible" in the sense that when it is viewed without filtered glasses, the image appears to be a normal two-dimensional image; however, when viewed through appropriately filtered glasses, a three-dimensional image is seen.

Essentially, in the Songer system, three-dimensional information is derived from defocus components of the objects to be photographed. Thus, if an object is sharply focused on to image plane of the camera, an object closer to the camera would normally be focused beyond the image plane. An object further from the camera would be sharply focused in front of the image plane. It can be shown that closer objects traverse the image plane with a defocus blur in the same sense as through the lens whereas further objects traverse the image plane with a defocus blur in the opposite sense. If complementary color filters cover horizontally opposite sides of the lens, a focused image will appear in normal full color, while defocused objects will have left and right borders encoded as described above. For example, if cyan and red filters are used, objects closer to the camera may have a red fringe on the right side and a cyan fringe on the left side. Objects further from the camera would have a red fringe on the left side and a cyan fringe on the right side. When viewed without the aid of glasses, these fringes do not materially affect the normal two-dimensional aspect of the picture; however, when viewed through corresponding filters, the left and right encoded images are combined to create a three-dimensional perception of the scene.

For a more complete understanding of anaglyph stereoscopy, reference is made to the aforesaid Songer patent which is hereby incorporated by reference into this specification.

In the Songer system it is necessary to introduce the color filtration at or near the aperture stop plane (which includes the iris or diaphragm opening) of the taking lens assembly of the camera to achieve the desired results. Therefore, each lens assembly to be used must be modified by the addition of appropriate complementary color filters. This is undesirable from a practical point of view when dealing with a family of lenses and/or complex and costly lenses, for example, of the zoom type.

Additionally, the Songer system causes a degradation of dstereoscopic information as the iris (diaphragm) opening is diminished. The light which traverses the optical system is determined by the available light, the opening of the iris, and the shutter speed. Conventionally, camera irises are round and the aperture is varied in two dimensions (i.e. both vertically and horizontally).

In the Songer system, the horizontal dimension of the iris determines the amount of useful fore and aft defocus and, hence, the stereoscopic separation of the images. Accordingly, with a standard round iris or diaphragm, as the size of the aperture is decreased, the three-dimensional effect is decreased.

OBJECTS OF THE INVENTION

A main object of this invention is to provide an optical relay capable of transferring the aperture stop within the original lens assembly of an imaging system to a location where it is readily accessible for further adaptation or modification for special visual effects.

A more specific object of the invention is to provide an optical relay, for use in an anaglyph stereoscopic system as disclosed by Songer, which contains the necessary color filtration so that modification of the taking lens is not required.

A further object of the invention is to provide an optical system for use in anaglyph stereoscopy wherein the three-dimensional defocus information is substantially unaffected by the size of the iris opening.

SUMMARY OF THE INVENTION

Briefly, in accordance with the invention, an optical relay, adapted to be interposed between the taking lens and a first image plane of an imaging system, includes a lens assembly for reforming the image at the first image plane at a second image plane and for transferring the image of the aperture stop of the taking lens to a readily accessible new plane within the lens assembly where an iris is located. In accordance with the preferred embodiment of the invention, the iris sustains a wide horizontal aperture throughout its actuation. Suitable anaglyph filtration means (or other light modification devices) may be positioned within the optical relay at or near said central plane.

THE DRAWINGS

FIG. 3 shows diagrammatically a preferred embodiment of an optical relay according to the invention arranged in the form of a periscope;

FIG. 4 shows diagrammatically a preferred embodiment of a one-dimensional iris according to the invention.

FIG. 5 shows the iris of FIG. 4 in its fully closed position;

DETAILED DESCRIPTION

Figure 1:
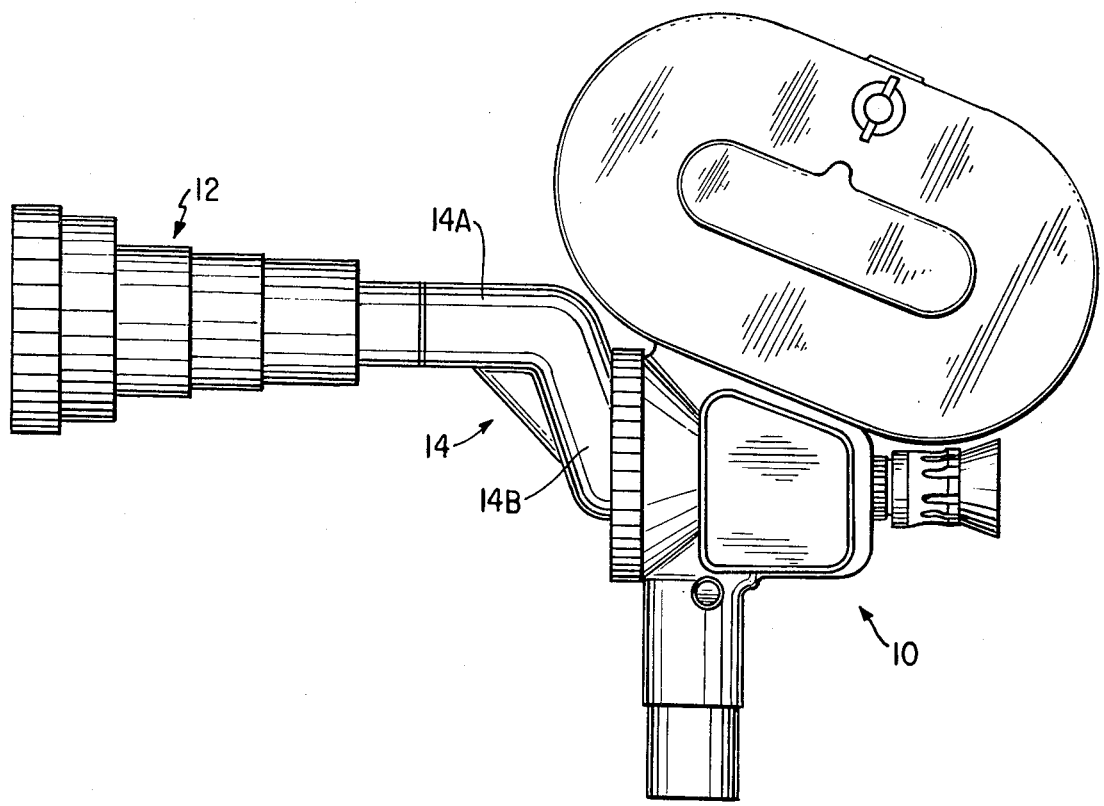
FIG. 1 is a side view showing how the invention would be used in conjunction with a zoom lens and motion picture camera.

FIG. 1 shows how the invention may be used in conjunction with a standard motion picture camera 10. The taking lens of the camera, shown at 12, in many cases will be expensive and complex. To adapt this camera to the Songer anaglyph stereoscopic system, it would be necessary to add the appropriate color filters to the lens 12 which would be difficult and costly. However, in accordance with the invention, an optical relay 14 is provided between the camera 10 and taking lens 12. The optical relay 14 will include appropriate fittings (not numbered) so that it can be coupled to the standard fittings on the lens and camera. In the preferred embodiment of the invention shown in FIG. 1, the optical relay is in the form of a periscope including a horizontal section 14A and a vertical section 14B in order to reduce the length of the required lens system. The vertical section 14B is at a slight angle from vertical so that the relay can conveniently be secured to the camera with adequate clearance between the two parts.

As explained below, the optical relay 14 functions to transfer the aperture stop within the lens 12 to a location within the relay 14 which, in this example, contains the color filters required for anaglyph stereoscopy and a specially designed iris. This means that no modification or adaptation of the costly lens 12 is required to take stereoscopic pictures and also the the existing lens 12 can be replaced by other conventional lens assemblies.

Figure 2:
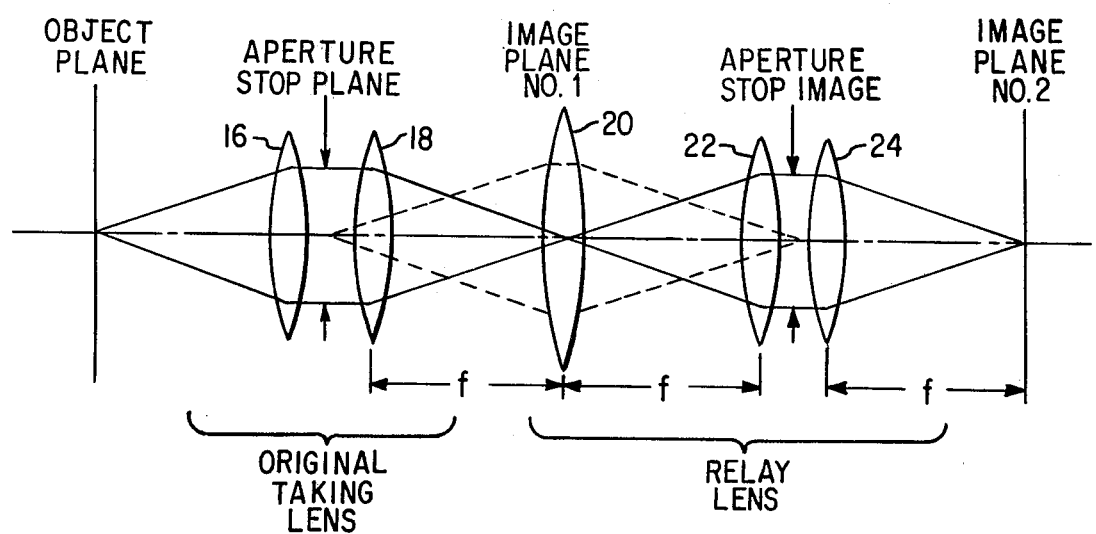
FIG. 2 shows diagrammatically the relationship of the taking lens and optical relay.

FIG. 2 shows diagrammatically the optical system including the original taking lens of the camera and the optical relay.

In FIG. 2, the taking lens 12 of the camera is represented schematically by front and rear lenses 16 and 18, respectively. The taking lens may be a standard finite conjugate lens comprising a plurality of front elements (16) and rear elements (18) with an intermediate space in which exist generally collimated light rays emanating from the object to be photographed. There is a plane in this area, generally referred to as the aperture stop plane (or the iris plane) which limits the size of the axial cone of energy which is accepted from object space and transferred to the image plane (within the camera body). As explained in the Songer patent, all light emanating from any point in object space and accepted by the lens will fill the aperture stop and it is at (or near) the aperture stop that the iris and requisite color filters for anaglyph stereoscopy must be physically located in the Songer system. Thus, to practice the Songer invention, it is necessary to modify the existing lens 12 by introducing the filters at the aperture stop.

The plane of focus of the lenses 16 and 18 would normally be at the photosensitive surface of the film within the camera; that surface is represented in FIG. 2 as image plane No. 1. In accordance with the invention, an optical relay, represented by lens 20, 22 and 24, functions to transfer the aperture stop plane of the original lens assembly to a location exterior of that lens assembly, and also to transfer image plane No. 1 to a second image plane (identified as image plane No. 2) which, in practice, will appear at the surface of the photosensitive material within the camera.

In FIG. 2 the lens 20 may comprise a field lens positioned at image plane No. 1. Lens 20 transfers the aperture stop plane of the original lens assembly to a plane (sometimes referred to herein as the "aperture stop image plane") between the lens system 22, 24 without vignetting (i.e. truncating marginal parts of the image). The lens assemblies 16, 18 and 22, 24 are shown symmetric although they need not be symmetric.

The distance marked "f" is the (thin lens) focal length of each half of the symmetric lens 22, 24. The distance "f" (in this one-to-one imaging system) is also nominally twice the focal length of the composite (symmetric) imaging lens and of the field lens 20.

The image of the aperture stop plane of the original lens 16, 18 appears at the place marked "aperture stop image" with the symmetric lens 22, 24 of the optical relay. Therefore, the generally collimated rays emanating from each image point in image plane No. 1 appear within this aperture stop image plane so that the spectral filtration described by Songer may be instituted in this new region. As described below, the iris (not shown in FIG. 2) is also located near the aperture stop image plane within the optical relay.

FIG. 3 shows in semi-diagrammatic form, a practical construction of an optical relay incorporating the optical system of FIG. 2. To the extent possible, the numerals of FIGS. 1 and 2 are used to identify corresponding elements in FIG. 3.

In a one-stage optical reimaging system, the image is inverted and reverted (i.e. reversed vertically and horizontally, respectively). This means that the optical system of FIG. 2 will cause an inverted/reverted image to be recorded on the photosensitive medium. It is generally desirable, particularly in the case of cameras having view-finders which are dependent on the image, to transform this inverted/reverted image to normal. In the preferred embodiment of the invention, as shown in FIG. 3, this is achieved by means of a mirror-prism technique as described below. In accordance with this feature of the invention, the mirror and prism arrangement used to normalize the image also "folds" the physical package to reduce its physical length.

The optical relay includes a housing 29 shaped like a periscope and in which the optical elements of the relay are retained. Two penta mirrors 30 and 32 vertically invert the image from field lens 20. An amici prism 34 at the output side of the lens system 22, 24, horizontally reverts the image so that the relayed image at the output of the optical relay is the same as the original image appearing near field lens 20. The lens system 22, 24 may comprise a conventional double gauss lens as illustrated in FIG. 3 although, of course, the invention is not so limited. The mirrors 30, 32 and the prism 34 are well-known optical devices. The choice (mirror or prism), in accordance with the preferred embodiment, is made primarily for optical path length adjustment. For example, glass generally increases the optical path by a factor equal to its index of refraction. Also, in the preferred embodiment, it is desirable to provide for the vertical inversion at the top of the periscope since this invention is more readily adaptable to a vertical dimension.

At or near the aperture stop plane of the lenses 22, 24, an iris 36 and the color filters 38 are positioned. As shown diagrammatically, the iris 36 and filters 38 may be physically mounted in a module 39 which is rotatable with respect to the periscope housing 29. The iris is described in further detail below with reference to FIG. 4 and serves to limit the amount of light traversing the lens system. The filters 38 (actually two complementary filters pursuant to the Songer system), although lying in an approximately horizontal plane will encode the left and right stereoscopic images as described by Songer.

The means for physically securing the various optical elements in place within periscope housing 29 are conventional and, therefore, are not illustrated in FIG. 3.

The use of an optical relay not only avoids the need to modify costly lens assemblies but may also provide important supplemental advantages, particularly insofar as anaglyth stereoscopy is concerned. Thus, stereoscopic photography requires left and right (i.e. horizontal) disparity of viewing corresponding to the viewer's left and right eyes. If Songer's camera is rotated ninety degrees, the filters will no longer be horizontally oriented and, therefore, the camera could not take stereo pictures unless the filter was correspondingly readjusted. An optical relay, according to the invention, can readily provide for rotating the filters as the camera is rotated so that left-right disparity is maintained. For this purpose, the iris 36 and filter 38 are mounted in the special module 39 which can be manually or automatically rotated as the camera is rotated. A pivoting weighted member may be coupled through a suitable linkage means so that the module maintains its correct orientation whether the camera is horizontally or vertically disposed.

Additionally, the optical relay of the invention enables convenient access to the filters for the purpose of adjusting the amount of stereoscopic disparity introduced by the system. In the Songer system, there is a trade-off between compatibility and stereoscopic separation. The more pronounced the defocused fringes, the greater the separation (and hence the stereoscopic effect); however, pronounced defocussed regions on the two dimensional image are more noticeable and, in that regard, the image is less compatible.

The optical relay of the invention enables the user to control this parameter by rotating the filters or by retracting the filters to add white light into the system. If the filters are rotated, the defocused fringes (on the two-dimensional images) will be incorrectly oriented for stereo disparity, whereas the introduction of white light by retraction of the filters will narrow the width of the fringes on the two-dimensional image, thereby reducing the viewer's perception of the fringes.

The invention is not limited to anaglyph stereoscopy. It may be used in any situation where it is desired to provide access to the aperture stop plane within a lens. For example, the invention may be used to create special visual effects such as prismatic image splitting and rotation, highlight diffraction and rotation or variable image tinting.

Where the invention is used in a stereoscopic system, a special iris construction, as shown in FIG. 4, may be employed.

Normally, iris openings are round and the iris is closed equally in both dimensions (horizontally and vertically) by a circular array of leaves to adjust the amount of light traversing the lens system. There are well-known reasons why this is generally desirable in normal imaging systems. In anaglyph stereoscopy, however, only the horizontal aperture width determines the amount of useful defocus and, hence, the stereoscopic separation of the image. Therefore, standard two-dimensional irises tend to diminish the stereoscopic affect as the iris opening is decreased to control the light throughput.

Accordingly, in accordance with this feature of the invention, the iris comprises an opening 40 through which the light for the lens system passes. The iris opening may be reduced by a pair of upper and lower plates 42 and 44, respectively, which function to restrict essentially only the vertical dimension of the iris and not its horizontal subtense. With this construction, the horizontal aperture dimension may be selected to provide the horizontal disparity required for stereoscopic separation while the vertical dimension alone is varied in the relay to adjust the light throughput required for correct exposure at a given shutter speed. Horizontal disparity can be further reduced by adjustment of the iris of the taking lens from its nominal wide open position.

In the preferred embodiment shown in FIG. 4, the opposing ends of the iris plates 42 and 44 include traingular cutout areas 46 so that the horizontal dimension of the iris is diminished as the vertical dimension is reduced to its minimum dimension. This enables a minimum vertical dimension to be maintained so as to avoid well known diffraction effects which cause a deterioration of resolution if the aperture is too small. At the same time horizontal separation is maintained through the overlapping areas 48 of the triangular cutout portions as the aperture size is reduced by the desired amount. The slopes and shapes of the triangular portions can be varied as needed to satisfy diffraction requirements. For example, if it is necessary to maintain a one millimeter vertical opening to satisfy diffraction requirements for adequte resolution and the nominal aperture opening at T/4 is 16 millimeters per side, reduction of the aperture opening to T/32 would require that the shaded portion 48 in FIG. 4 have an included area of four millimeters squared, i.e. a sixty-four times reduction of the fully opened 256 millimeter square original aperture. In this example, horizontal disparity is retained even in the closed position due to the horizontal separation between the small iris triangles 48, with each triangle forming its required encoded color image on the image plane.

Greater separation than that shown in FIG. 4 is possible for greater horizontal disparity but this may result in increased image aberration because of utilization of marginal regions of the lens. Shapes other than triangles may also be used consistent with the resolution limitations due to aperture diffraction for a selected aperture area.

Figure 8:
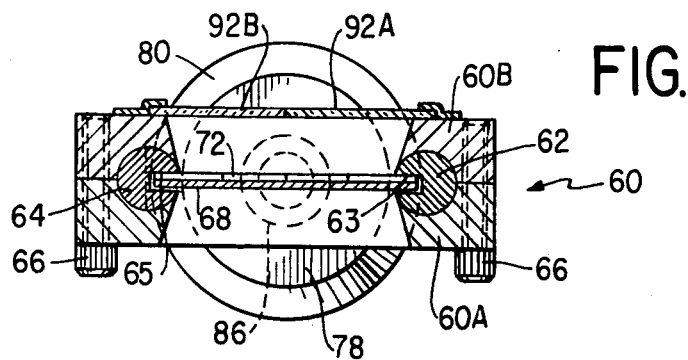
FIG. 8 is a sectional view along the line 8—8 of FIG. 7.

The use of a vertically actuated iris avoids the need to use the special filter constructions shown in FIGS. 8, 9 and 10 of Songer. Those "butterfly" constructions selectively eliminate rays travelling predominately along vertically displaced paths through the lens in order to enhance the definition of upper and lower edges; however, they also reduce filtration as the iris opens. Since the same effect (of selective elimination) is provided by the vertically actuated iris of FIG. 4, the filters used with the invention may fill essentially the entire iris opening, for example, as shown schematically in FIGS. 2 and 5 of Songer.

Figure 6:
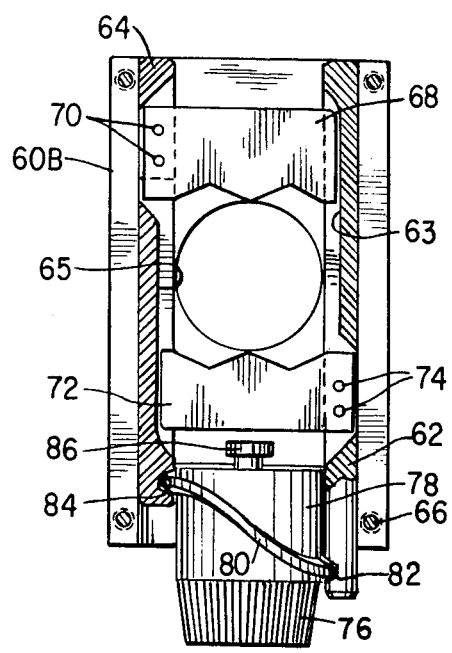
FIG. 6 is a front view, partially in section, of the construction of a module incorporating a one-dimensional iris.
Figure 7:
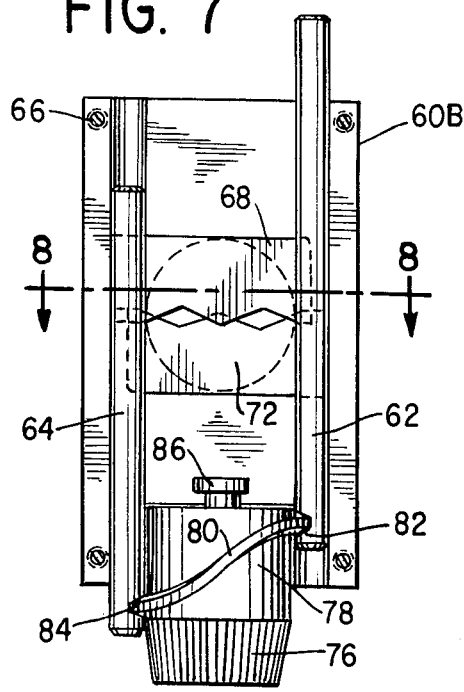
FIG. 7 is a front view of the module showing the iris in its fully closed position.

FIGS. 6, 7, and 8 show the construction of a module adapted to be inserted into a camera (for example, as shown in FIG. 3 to provide the stereoscopic visual effects as described above. The specific means for maintaining the module within the camera is not shown.

The module includes a rectangular frame 60, in which two rods 62 and 64 slide vertically. The frame 60 may include half sections 60A and 60B held together by fasteners 66.

The rods 62 and 64 include elongated slots 63 and 65 shaped as shown in FIG. 6. An upper diaphragm blade 68 is secured to rod 64 within slot 65 by means of fasteners 70. Likewise, a lower diaphragm blade 72 is secured to rod 62 within slot 63 by fastener 74.

The diaphragm blades 68 and 72 are controlled manually by a knob 76, which includes a cylindrical barrel 78 around which a helical cam 80 extends. The cam 80 cooperates with a slot 82 in rod 62 and a slot 84 in rod 64. An axle 86 extends upwardly from barrel 78 into appropriately shaped openings (not numbered) within the plates 60A and 60B to retain this manual control member. When the knob 76 is rotated, the cam 80 forces the rods 62 and 64 in opposite directions, opening or closing the diaphragm as desired. FIG. 6 shows the diaphragm blades 68 and 72 fully opened, whereas FIG. 7 shows the blades of the diaphragm as fully closed.

The filter may comprise a dual frame 90, in which the complementary filter elements 92A and 92B are retained. This construction is conventional and the module may be provided with suitable slots for retaining the filter elements so that when the module is inserted into the camera, the respective filters each cover half of the lens aperture opening.

What is claimed is:

1. An optical relay adapted to provide convenient access to the effective first aperture stop of a first imaging system, comprising:
    a lens assembly for transferring the image from said first imaging system to a new image plane,
    means for transferring the image of said first aperture stop to an aperture stop image plane of said lens assembly remote from said first aperture stop, and
    light modification means positioned near said aperture stop image plane.

2. An optical relay according to claim 1, wherein said means for transferring comprises a field lens.

3. An optical relay according to claim 1 including means for inverting or reverting the image.

4. An optical relay according to claim 3, wherein said means for inverting or reverting deflects the light both vertically and horizontally.

5. An optical relay according to claim 4, wherein the light is deflected vertically at an angle other than ninety degrees.

6. An optical relay according to claim 5, wherein said iris includes means for restricting the light traversing said aperture stop image plane in essentially one direction only.

7. An optical relay according to claim 6, wherein said iris and anaglyph filtration means are rotatable relative to said lens assembly.

8. An optical relay according to claim 7, including means for inverting or reverting the image.

9. An optical relay according to claim 8, wherein said means for inverting or reverting deflects the light both vertically and horizontally.

10. An optical relay according to claim 9, wherein the light is deflected vertically at an angle other than ninety degrees.

11. An optical relay adapted to be interposed between the taking lens and body of a camera for use in anaglyph stereoscopy, comprising:
    a lens assembly for transferring a first image to a first image plane within said camera,
    a field lens for transferring the image of the aperture stop of said taking lens to an aperture stop image plane of said lens assembly remote from the aperture stop of the taking lens, said field lens being positioned near said first image plane of said taking lens,
    anaglyph filtration means positioned near said aperture stop image plane, and
    an iris positioned near said aperture stop image plane.

12. An optical relay according to claim 11, wherein said iris includes means for restricting the light traversing said aperture stop image plane in essentially a vertical direction only.

13. An optical relay according to claim 12, wherein said means for restricting comprises plates having opposing edges shaped to reduce the horizontal dimension of the iris when the iris opening approaches a minimum.

14. An optical relay according to claim 6 or 12, wherein said anaglyph filtration means includes left and right complementary filters filling essentially the entire iris opening.

15. An optical relay according to claim 11 wherein said iris and anaglyph filtration means are rotatable relative to said lens assembly.

16. In combination, an optical imaging system and an optical relay, said imaging system having a first aperture stop at which the brightness of the light passing through the imaging system can be varied without affecting image quality, said optical relay being physically detachable from said imaging system and comprising a lens assembly for transferring the image from said imaging system to a new image plane, means for transferring the image of said first aperture stop to an aperture stop image plane of said lens assembly within said optical relay, and means for positioning preselected light modifying means near said aperture stop image plane.

17. A method of providing convenient access to the effective first aperture stop of a first imaging system, comprising transferring the image from the first imaging system to a new image plane and simultaneously transferring the image of the first aperture stop to an aperture stop image plane which is remote from said first aperture stop and which is conveniently accessible to preselected light modifiers such as color filters and/or diaphragms.

* * * * *